(12) United States Patent
Reid

(10) Patent No.: US 8,295,326 B1
(45) Date of Patent: Oct. 23, 2012

(54) DIGITAL CODING SCHEME FOR DATA TRANSMISSION

(75) Inventor: Ceri Reid, Largo, FL (US)

(73) Assignee: University of South Florida, Tampa, FL (US)

( * ) Notice: Subject to any disclaimer, the term of this patent is extended or adjusted under 35 U.S.C. 154(b) by 544 days.

(21) Appl. No.: 12/483,471

(22) Filed: Jun. 12, 2009

Related U.S. Application Data

(60) Provisional application No. 61/060,967, filed on Jun. 12, 2008.

(51) Int. Cl.
*H04B 1/00* (2006.01)

(52) U.S. Cl. ......................... 375/146; 375/140

(58) Field of Classification Search ................ 375/146
See application file for complete search history.

(56) References Cited

U.S. PATENT DOCUMENTS

| | | |
|---|---|---|
| 6,654,926 B1 | 11/2003 | Raphaeli et al. |
| 6,728,296 B1 | 4/2004 | Yung |
| 6,928,296 B2 | 8/2005 | Kanemoto et al. |
| 7,096,403 B2 | 8/2006 | Seki |
| 7,224,716 B2 | 5/2007 | Roman |
| 7,751,464 B2 * | 7/2010 | Kim et al. ............... 375/144 |
| 7,849,389 B2 * | 12/2010 | Shen et al. ............... 714/800 |
| 2006/0013168 A1 | 1/2006 | Agrawal et al. |
| 2007/0147481 A1 * | 6/2007 | Bottomley et al. ........... 375/148 |

OTHER PUBLICATIONS

Sheryl L. Howard and Christian Schlegel, Differential Turbo-Coded Modulation With APP Channel Estimation, IEEE Transactions on Communications, vol. 54, No. 8, Aug. 2006, pp. 1397-1406.

Raymond L. Pickholtz, Donald L. Schilling, Laurence B. Milstein, Theory of Spread-Spectrum Communications—A Tutorial, IEEE Transactions on Communications, vol. Com-30, No. 5, May 1982, pp. 855-884.

Xiangui Kang, Jiwu Huang, Yun Q. Shi, and Jianxiang Zhu, Robust Watermarking with Adaptive Receiving, IWDW 2003, LNCS 2939, pp. 396-407, 2004.

Mario E. Magana, David H. Buck, and Joachim Speidel, Improvement of Data Rate Performance of Wireless Local Area Networks, through the Use of Orthogonal Code Division Multiplexing (OCDM), Multipath Diversity, and Parallel Concatenated Channel Encoding, Wireless Personal Communications 25: 293-305, 2003, Kluwer Academic Publishers.

Cheng-Po Liang and Wayne E. Stark, Turbo Codes in DS-SS with Adaptive Nonlinear Suppression of Impulsive Interference, Department of Electrical Engineering and Computer Science, University of Michigan, Ann Arbor, pp. 408-412, 1999.

Bernard Grundlehner, Jaap Haartsen, Rajan Srinivasan, Improved Synchronization Performance in DSSS Systems Using Concatenated Sequences, IEEE 7th Int. Symp. on Spread-Spectrum Tech. & Appl., Prague, Czech Republic, Sep. 2-5, 2002, pp. 756-760.

Christian Schlegel, Lance C. Perez, Trellis and Turbo Coding, ISBN 0-471-22755-2, 2004 Institute of Electrical and Electronics Engineers, pp. 125-154.

(Continued)

*Primary Examiner* — David Payne
*Assistant Examiner* — Erin File
(74) *Attorney, Agent, or Firm* — Molly L. Sauter; Smith & Hopen, P.A.

(57) ABSTRACT

Provided is a system and method of digitally encoding and decoding digital data during the transmission process using a combination of Direct Sequence Spread Spectrum (DSSS) and turbo coding. A DSSS de-spreading process is used in place of the outer decoder functional block of a turbo decoder, which removes the need for a dedicated outer ECC code. Removal of the dedicated outer ECC code allows for an increase in the actual data rate transmitted through the channel (compared with a system which uses a discrete DSSS stage after Turbo coding or some other ECC code) because the number of bits to be transmitted for a given data rate has been reduced.

13 Claims, 5 Drawing Sheets

OTHER PUBLICATIONS

S. Howard, C. Schlegel, L. Perez, Differential Turbo Coded Modulation over Unsynchronized Channels, Prog. of IASTED 3rd Int. Conf. on Wireless and Optical Communications, 2002.

L. R. Bahl, J. Cocke, F. Jelinek, J. Raviv, Optimal Decoding of Linear Codes for Minimizing Symbol Error Rate, IEEE Transactions on Information Theory, pp. 284-287, Mar. 1974.

Raymond L. Pickholtz, Donald L Schilling, Laurence B. Milstein, Theory of Spread-Spectrum Communications—A Tutorial, IEEE Transactions on Communications, vol. Com-30, No. 5, May 1982.

Cheng-Po Liang and Wayne E. Stark, Turbo Codes in DS-SS with Adaptive Nonlinear Suppression of Impulsive Interference, Department of Electrical Engineering and Computer Science, University of Michigan, Ann Arbor.

Bernard Grundlehner, Jaap Haartsen, Rajan Srinivasan, Improved Synchronization Performance in DSSS Systems Using Concatenated Sequences, IEEE 7th Int. Symp. on Spread-Spectrum Tech. & Appl., Prague, Czech Republic, Sep. 2-5, 2002.

* cited by examiner

DIGITAL CODING SCHEME FOR DATA TRANSMISSION

CROSS REFERENCE TO RELATED APPLICATIONS

This application claims priority to U.S. Provisional Patent Application Ser. No. 61/060,967, filed Jun. 12, 2008.

STATEMENT OF GOVERNMENT INTEREST

This invention was made with Government support under Grant No. DASG60-00-C-0089 awarded by the Army Research Office and Grant No. 2500 00 4100 awarded by United States Special Operations Command (SOCOM). The Government has certain rights in the invention.

FIELD OF INVENTION

This invention relates generally to communication and, more specifically, to digital data transmission in a wireless communication system.

BACKGROUND

Digital data transmission over cables, fibers, radio, or acoustic links suffers from interference by various sources of noise. This decreases the signal-to-noise ratio (SNR) available at the receiver, which, in turn, can lead to errors in decoding the received data.

Coding schemes (error checking and correction (ECC)) are used to improve the probability that each bit of received data will be decoded correctly. However, the penalty for improved bit error rates (BER) is a reduction in the effective transmitted data rate due to the additional bits that must be transmitted with the data to correct the errors. For example, if eight bits need to be transmitted and four bits must be added to ensure that the eight bits are decoded correctly, the data rate is reduced by 50%.

In very poor SNR environments, the tradeoff between BER and the actual data rate is especially challenging. The underwater acoustic communications channel is typically a very poor SNR environment. One way of improving the actual data rate for a given SNR is to decrease the overhead required to maintain a given BER.

Direct sequence spread spectrum (DSSS) and turbo coding are both widely used in radio and acoustic communications. The function of DSSS is to spread data over a larger bandwidth, allowing the data to be recombined at the receiver and the noise power to be reduced (i.e. an improved SNR). Turbo coding (or any other forward error correction scheme) is then applied to the decoded DSSS signal in an attempt to minimize the BER.

One approach to turbo coding uses serially concatenated codes. Serially concatenated turbo codes were invented in the mid-1990's and are now taken to be the gold standard for forward error correction in very noisy environments. They are widely used in satellite communications and in cell phone communications. In this approach, each of the two decoders uses a slightly different algorithm to decode the noisy data stream, then the decoders exchange data and repeat the decoding process on the data block already processed by the other decoder. Over the course of numerous iterations of swapping and decoding, the best possible BER for the given SNR is achieved.

Currently, when DSSS and turbo coding are both used in a particular application, the two technologies are treated as two completely separate functions: the DSSS functional block processes the data in isolation, and then sends it to the turbo coding block, where iterative decoding is performed. Both technologies are described below in further detail.

DSSS

DSSS is well-known technology. Raymond L. Pickholtz, et al., Theory Of Spread-Spectrum Communications—A Tutorial, IEEE Trans Communications, Vol. COM-30, No. 5, p. 855-884 (May 1982); Harold P. E. Stern & Samy A. Mahmoud, Communication Systems Analysis and Design, Pearson Prentice Hall, NJ (2004). The purpose of DSSS is to spread the information contained in a signal over a wider bandwidth, then to de-spread it in a way that reduces the noise power relative to the signal power. This causes an effective increase in the SNR at the receiver, thereby decreasing the signal's susceptibility to interference from other signal sources or random noise. The spreading factor (N) is the increase in bandwidth resulting from the spreading operation; for example, a spreading factor of seven would increase the bandwidth by a factor of seven.

The standard method of spreading the signal is to create a pseudo-random binary code sequence (known as a pseudo random number or PRN) which is combined with the binary data to be transmitted. The PRN sequence is a multiple of the data block size. For example, if a spreading factor of seven were used, then the PRN would be seven times the size of the data block being transmitted. A number of algorithms can be used to create the PRN. The 'best' PRN is one that has the optimal combination of low autocorrelation and low cross-correlation with other codes of the same family. The autocorrelation property requires that if the PRN is correlated with any bit-shifted version of itself, the autocorrelation output will be significantly lower for any non-zero bit shift than for a bit shift of zero. This property allows the receiver to synchronize with the received PRN as reliably as possible. The cross-correlation property requires that the cross-correlation between any two codes in the PRN code family, for any bit shift, is much lower than the autocorrelation of each code with a bit shift of zero. This causes transmissions spread by other codes in the same PRN family to appear as random (uncorrelated) noise, maximizing the signal to noise ratio (SNR) of the decoded binary data. This allows simultaneous use of the same channel by several transmit/receive pairs using the same PRN family with minimal interference.

To create the output signal from the PRN sequence and the data block, each bit in the data block is exclusive-or'd (XOR'd) with bits in the PRN sequence. The number of bits used is defined by the spreading factor. If a spreading factor of seven is used, each data bit is XOR'd with seven PRN bits. The resulting data stream is pseudo-random, and has a bandwidth that is wider than the data stream. This transmission bandwidth is the data bandwidth multiplied by the spreading factor. The effect is that the original data stream is replaced with a pseudo-random data stream of higher bandwidth.

To decode the DSSS, the received binary data stream is synchronized with the original PRN sequence and the XOR operation repeated. By the nature of the XOR operation, the result (if no noise were present between the transmitter and receiver) would be the reproduction of the original data stream, but with each bit repeated N times (where N is the spreading factor). In a noisy environment, the received bit stream will not match the transmitted stream (i.e the spread data stream). After dispreading, rather than getting N bits of the same value (the value of the data bit), some of those N bits will have the wrong value, and a mechanism is required to decide the value of the original data bit. The usual mechanism is to take the average of the decoded bits (e.g. for a spreading factor of seven, the average value of the seven bits XOR'd from the received data stream is obtained), threshold the average (to get a result of 1 or 0), and use this as the best estimate of the original data bit.

It should be noted that the de-spreading mechanism is not considered to be part of the ECC used to protect the integrity of the data stream during DSSS transmission. Typically, a completely different ECC layer is applied to the data stream that emerges from the DSSS de-spreading process. In recent years, various forms of trellis and turbo coding have been used for this.

Turbo Coding

ECCs are used to detect and correct errors introduced when binary digital data is stored or transmitted. The simplest such code is the familiar parity bit used in serial data transmission and digital data storage. A single parity bit is capable of detecting that data corruption has occurred, but cannot correct it. To allow error detection and correction, more bits must be added to each byte of the data stream, creating an overhead that increases the bandwidth of that data stream. The higher the overhead, the larger the number of ECC bits there are per data byte and the better the data is protected. The ratio of overhead to data bits is extremely important, as many data operations are bandwidth-limited. Data transmission or reception by wired or wireless means are always bandwidth limited. The more bandwidth used by the ECC, the less there is available for data. Therefore, the efficiency of the ECC is very important—better data protection at a lower ECC overhead. Data integrity is usually measured as the BER, allowing performance comparison between different coding schemes.

The essence of turbo coding is to combine two relatively weak ECCs to provide much better ECC performance than previous ECC codes for a given overhead. The two codes are designed to be complementary, so that the overall coding scheme is much better at detecting and correcting errors than either code is on its own. The improvement in coding performance is highly non-linear. Christian B. Schlegel & Lance C. Perez, *Trellis and Turbo Coding*, IEEE Press, NJ, Ch. 12 (2004).

Two implementations of turbo codes are generally used: parallel concatenated and serially concatenated. The first implementations of turbo codes were parallel-concatenated codes, and the term turbo code is usually used to refer to parallel concatenation. However, the principles of the serial- and parallel-concatenated codes are very similar, and the term 'turbo code' is used herein to refer to both. Serially concatenated codes are more relevant to this discussion, and only serially concatenated codes will be described in detail.

Turbo Coding: Coding

A block diagram of Turbo coder 100, located on the transmitter side, is illustrated in FIG. 1. The data stream to be transmitted is divided into blocks (e.g. 4,096 bits). The block is processed by outer ECC coder 102, which transforms incoming uncoded words in the data block 101 to coded words in data block 103, also known as symbols, (which will be longer than the uncoded words of data block 101). The uncoded word of data block 101 can consist of any number of bits; the number of bits added during the coding operation will depend on the ECC code used. At the end of this outer coding operation, the data block will have expanded as additional ECC bits are added to the data bits.

After coding, the data is interleaved by interleaver 104. That is, each bit in the encoded data block maps to an arbitrary (randomized) location in interleaved data block 105. The effect of this process is to spread the data uniformly through interleaved data block 105, maximizing the distance between bits that formed part of the same ECC code word during the coding process. This minimizes the effect of multiple bit errors on the data integrity, as multiple random errors are much less likely to disrupt any single code word. Multiple errors are likely to cause multiple single bit errors in number of code words, rather than causing multiple errors in a single code word (which might so corrupt the word as to make the original data unrecoverable). The same random interleaving scheme is used for all incoming data blocks. The interleaver design is a critical part of the turbo coding scheme design.

Interleaved encoded data block 105 is now processed by inner ECC coder 106. This process adds some coding overhead bits to interleaved encoded data block 105, further expanding the encoded data block.

At this point, interleaved encoded data block 107 is transmitted through channel 108.

Note that the turbo coding process is completely deterministic and computationally undemanding.

Turbo Coding: Decoding

A block diagram of Turbo decoder 200, located on the receiver side, is shown in FIG. 2. Decoding serially concatenated turbo codes starts by passing received data block 201 through inner decoder 202. Received data block 201 comprises the same number of bits as interleaved encoded data block 107 that emerged from inner coder 106 during turbo coding. Generally, some noise will have corrupted the data stream.

Inner decoder 202 does not produce a 'best estimate' binary data stream; instead, it produces a likelihood ratio (LHR) for each bit it decodes. LHRs are commonly used in processes that must represent probabilities that are to be combined in some fashion. The LHR represents the probability that the bit is a '1' to the probability that the bit is a '0'. If a data bit is definitely a '1', then the LHR will be positive infinity. If the data bit is definitely a '0', then the LHR will be negative infinity. An LHR of '1' indicates that the data bit value is equally likely to be '1' or '0'.

The LHR is determined by the decoding process. If no errors have occurred, the decoding process will produce a very high negative or positive LHR (indicating that the value of the decoded bit is known with high confidence). If multiple errors have occurred, then very the LHR values will be close to '1'. These LHRs will be the same for all bits of a decoded word, as the Inner Decoder on its own cannot determine which of the bits in the word are more or less reliable.

LHR block 203 emerging from inner decoder 202 is then de-interleaved (by interleaver 204) using the reverse of the randomized interleave mapping used during the coding process. The effect of this is to spread the LHRs through the data block, so that the LHRs are no longer next to the LHRs from the same word decoded in inner decoder 202.

At this point, de-interleaved LHR block 205 is of the same size, and in the same bit order, as encoded bit block 103 that emerged from outer coder 102 during the coding process. De-interleaved LHR block 205 is passed to outer decoder 206, which performs a probabilistic decode of data block 205 using the LHRs. The output from outer decoder 206 is a block of LHRs 207, indicating the confidence with which each bit value in the decoded word can be assigned. Again, the LHRs for a given code word will all show the same confidence level for each bit in the word.

The power of turbo coding stems from the next step, which is to interleave (at interleaver 209) LHR block 207 produced by outer decoder 206, and to feed it back into inner decoder 202 as a priori probabilities. Inner decoder 202 uses a Bayesian mechanism to combine the prior probabilities produced by outer decoder 206 during the decoding process, and again produces an output, which is an interleaved sequence of LHRs. This interleaved LHR block is de-interleaved (by de-interleaver 204), and introduced into outer decoder 206, which uses a Bayesian mechanism to perform a probabilistic decoding of the data block.

This passing of the LHR blocks between inner decoder 202 and outer decoder 206 continues until the LHRs produced at outer decoder 206 tend towards positive or negative infinity (indicating high confidence in the decoded bit values), or until the LHRs stagnate (no improvement in LHRs at the Outer Decoder on successive iterations) (decided at decision block 208). At this point, the decoding process is complete, and the LHRs are converted (in conversion block 310) to binary bit values.

During the iteration process, the LHRs emerging from the inner decoder 202 and outer decoder 206 are modified to remove the prior knowledge (i.e. the LHR values that were fed into the decoder), so that only the new knowledge (in the form of modified LHR values) is fed to the decoder.

As shown in *Trellis and Turbo Coding*, it is evident that the inner code should use feedback. Schlegel & Perez, Ch. 11. That is, the code word output for a given data word will depend on the previous code word output. The outer code can be any ECC, although convolutional codes are most efficient.

The turbo decoding process is non-deterministic, i.e. the number of iterations to produce a decoded bit block will vary with the amount of noise introduced during transmission. The implementation of turbo codes in software is complex compared to earlier coding schemes.

Turbo codes may be seen as trading simplicity of computational implementation for better performance. In many applications, the requirement for extra computing power at the decoder is justified by the improved BER.

Modulation

Digital data can be transmitted either as raw signal levels (e.g. +5V corresponding to a '1', 0V to a '0'), or used to modulate some other waveform. Modulation serves two main purposes: it moves the data from baseband to the desired frequency for transmission and it can be used to increase the integrity of the data stream. This makes the demodulated signal less susceptible to corruption by noise during the transmission, propagation, and reception processes.

A number of different types of modulation are used: e.g. phase shift keying (PSK); amplitude shift keying (ASK); quadrature amplitude modulation (QAM); frequency shift keying (FSK) and chirp shift keying (CSK). This discussion will focus on the use of PSK, but the coding technique can be used for any modulation scheme, or combination of modulation schemes.

At its simplest, PSK uses a single bit's value to alter the relative phase of the sinusoid to be transmitted. For example, transmitting a '1' might correspond to a sine wave, and transmitting a '0' might correspond to a cosine wave. This is known as binary phase shift keying (BPSK), and the phase shift between '1' and '0' is 180 degrees. Quadrature Phase Shift Keying (QPSK) uses two bits together to define the phase of the output waveform. For example, '00' might correspond to a phase of 0 degrees, '01' to 90 degrees, '10' to 180 degrees, and '11' to 270 degrees. Clearly, other forms of PSK can be defined which will just use different phase offsets. For instance, 8PSK uses three bits and defines eight phase offsets.

Differential PSK is used to allow non-coherent demodulation of PSK. In this form of PSK, the phase offset used in for the transmission of the previous bit sequence is used as an input by the differential modulator, i.e., feedback of the modulation output is used to define the modulation for a given code word. For example, in QPSK the first time the sequence '00' is transmitted, it might correspond to a phase offset of 90 degrees, but a succeeding sequence of '00' might be given a phase offset of 180 degrees. Logic at the receiver tracks the phase of the incoming signal and applies a differential demodulation scheme to arrive at the original bit sequence.

Differential forms of other modulation schemes are also used, and can be substituted in this discussion.

Differential Coded Modulation

Differential Coded Modulation is a known modulation method. Sheryl L. Howard, & Christian Schlegel, *Differential Turbo Coded Modulation with APP Channel Estimation*, IEEE Trans Communications, p. 1397-1406 (August 2006); Sheryl L. Howard, et al., *Differential Turbo Coded Modulation over Unsynchronized Channels*, Proc. of W.O.C. 2002, Banff, AB, Canada (July 2002). In this scheme, the inner coder is also used to define the modulation used by a data sequence, using a differential form of a modulation scheme (e.g. Differential PSK). Differential modulation uses feedback (as required for a serially concatenated turbo code), and, therefore, is eligible for use as an inner code in a serial concatenated scheme. The outer code suggested by Howard and Schlegel was a conventional parity check code. A block diagram of a decoder as described by Howard and Schlegel is shown in FIG. 3.

SUMMARY OF INVENTION

The present invention implements a combination Direct Sequence Spread Spectrum (DSSS) and turbo coding to create a novel system and method of digitally encoding and decoding digital data during the data transmission process.

In an embodiment, the method of method of DSSS turbo encoding comprises performing DSSS spreading on incoming data, interleaving the spread data, and applying an inner code to the interleaved, spread data. DSSS spreading of the incoming data may comprise exclusive or'ing (XOR'ing) the data bits of the incoming data and a PRN sequence.

In an embodiment, the DSSS turbo encoder comprises an outer encoder for performing DSSS spreading on incoming data, an interleaver coupled to the outer encoder for interleaving the spread data, and an inner encoder coupled to the interleaver for applying an inner code to the interleaved and spread data. The outer encoder may perform DSSS spreading on incoming data by exclusive or'ing (XOR'ing) the data bits of the incoming data and a PRN sequence.

In an embodiment, the method of DSSS turbo decoding begins by receiving an incoming data stream having a plurality of symbols, determining a probabilistic estimate of each of the symbols, and converting each of those probabilities into bit LHRs. The probabilistic estimate of the symbols may be determined using probabilistic differential demodulation. Further, the probabilistic differential demodulation may be performed using uniform a priori information.

Then, a priori probabilities are moved from the bit LHRs to create modified bit LHRs. The removal of a priori probabilities may comprise dividing the bit LHRs by a plurality of interleaved bit LHRs. The modified bit LHRs are de-interleaved and DSSS LHR de-spreading is performed on the de-interleaved bit LHRs. The method may further comprise outputting the de-spread, de-interleaved bit LHRs responsive to decoding being complete.

DSSS LHR de-spreading of de-interleaved bit LHRs may comprise obtaining a DSSS PRN sequence, which contains a plurality of PRN bits, generating a plurality of PRN LHRs by performing an XOR (exclusive or) operation on a first of the de-interleaved bit LHRs and the DSSS PRN sequence, and multiplying together each of the plurality of PRN LHRs derived from the first of the de-interleaved bit LHRs to obtain a decoded bit LHR for the first of the interleaved bit LHRs. The method may further comprise outputting the decoded bit LHR responsive to decoding being complete.

In another embodiment, the method further comprises removing a priori probabilities from the de-spread LHRs, interleaving the resulting set of modified bit LHRs, and then converting the interleaved, modified bit LHRs to symbols. The symbols are used as prior probabilities in determining the probabilistic estimate of the first set of symbols. The removal of a priori probabilities may comprise dividing the de-spread LHRs by the de-interleaved bit.

In an embodiment, the DSSS turbo decoder comprises an inner decoder for receiving an incoming data stream having a first plurality of symbols and determining a probabilistic estimate of the first plurality of symbols and symbol-to-LHR conversion circuitry coupled to the inner decoder for converting the probabilities of each of the first plurality of symbols into a plurality of bit likelihood ratios (LHRs). The inner decoder may determine the probabilistic estimate of each of the first plurality of symbols using probabilistic differential demodulation and it also may perform the probabilistic differential demodulation using uniform a priori information.

The DSSS turbo decoder further comprises a first divider coupled to the symbol-to-LHR conversion circuitry for removing a priori probabilities from the plurality of bit LHRs to create a first plurality of modified bit LHRs. The first divider may remove a priori probabilities from the plurality of bit LHRs by dividing the plurality of bit LHRs by a plurality of interleaved bit LHRs.

In addition, the DSSS turbo decoder comprises a de-interleaver coupled to the first divider for de-interleaving the first plurality of modified bit LHRs; and an outer decoder coupled to the de-interleaver for performing DSSS LHR de-spreading on the plurality of de-interleaved bit LHRs. The outer decoder may also output the de-spread, de-interleaved bit LHRs responsive to decoding being complete.

In another embodiment, the DSSS turbo decoder further comprises a second divider coupled to the de-interleaver and the outer decoder for removing a priori probabilities from the de-spread LHRs to create a second plurality of modified bit LHRs. The second divider may remove a priori probabilities from the de-spread LHRs by dividing the de-spread LHRs by the de-interleaved bit LHRs. This embodiment of the DSSS turbo decoder also comprises an interleaver coupled to the first divider and the second divider for interleaving the second set of modified bit LHRs to create a plurality of interleaved bit LHRs, and LHR-to-symbol conversion circuitry coupled to the interleaver and to the inner decoder for converting the plurality of interleaved bit LHRs to a second plurality of symbols, wherein the second plurality of symbols used as prior probabilities in determining the probabilistic estimate of the first plurality of symbols.

The outer decoder may perform DSSS LHR de-spreading on the plurality of de-interleaved bit LHRs by obtaining a DSSS PRN sequence comprising a plurality of PRN bits, generating a plurality of PRN LHRs by performing an XOR (exclusive or) operation on a first of the plurality of de-interleaved bit LHRs and the DSSS PRN sequence, and multiplying together each of the plurality of PRN LHRs derived from the first of the plurality of de-interleaved bit LHRs to obtain a decoded bit LHR for the first of the plurality of interleaved bit LHRs. The outer decoder may also output the decoded bit LHR responsive to decoding being complete.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
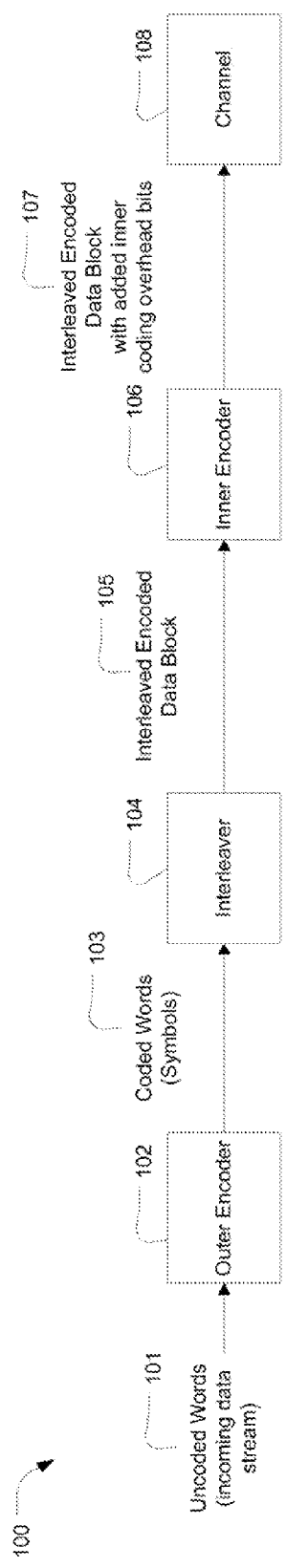
FIG. 1 is a block diagram of a turbo coder.
Figure 2:
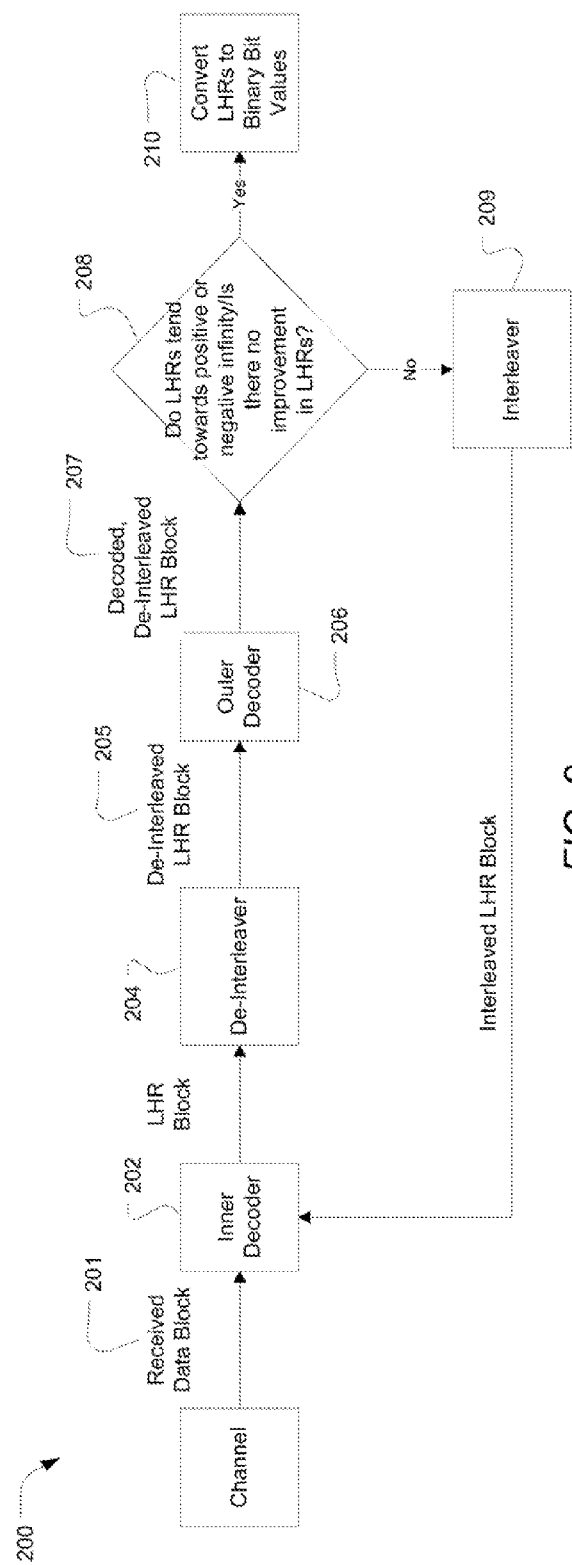
FIG. 2 is a block diagram of a turbo decoder.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention implements a combination Direct Sequence Spread Spectrum (DSSS) and serially concatenated turbo coding to create a novel system and method of digitally encoding and decoding digital data during the data transmission process.

Conventionally, the DSSS spreading/de-spreading mechanism is considered as a different process from the error correction code (ECC) coding/decoding mechanism, and usually both of these are also independent of the modulation scheme. Howard and Schlegel proposed making the modulation scheme part of the ECC (turbo) coding/de-decoding scheme. The present invention takes that idea one step further, and integrates DSSS spreading/de-spreading with the ECC/modulation mechanism. This gives a single integrated DSSS/ECC/modulation mechanism.

In the present invention, a DSSS de-spreading process is used in place of the outer decoder functional block of a turbo decoder. This removes the need for a dedicated outer ECC code. The de-spreading mechanism of DSSS forms a very simple 'majority rule' ECC. That is, if seven bits are being de-spread, the output data bit value will be '1' if the average of the seven spread bits is greater than 0.5, and '0' if that average is less than 0.5. Compared with other possible ECCs with the same coding overhead, this is a very weak code, with poor error detection and correction capabilities. The DSSS de-spreading mechanism is used in the outer decoder, without in any way compromising the de-spreading.

The attraction of this technique is that there is no need for a dedicated outer ECC code, and its coding overhead can be removed. This means that the actual data rate transmitted through the channel is increased, because the number of bits to be transmitted for a given data rate has been reduced. This data rate increase is significant in circumstances where the presence of narrowband noise sources (e.g. multipath interference) dictates the use of DSSS in addition to conventional ECC techniques. Although the DSSS spreading is a very poor ECC for the number of bits used, typical spreading factors are large enough that the actual ECC power of the spreading/de-spreading is more than adequate for use as an outer code in a serially concatenated turbo code, allowing low BERs to be achieved. Higher spectral efficiency has been attained for the same DSSS processing gain (G), allowing better narrowband interference rejection for a given transmission bandwidth.

In previous implementations of DSSS de-spreading, the information contained in the spreading bits has been discarded after the 'majority rule' determination of the data bit has been carried out. The use of DSSS de-spreading as the outer code of a turbo coding scheme means that all of this information is retained and used to improve the BER of the data stream, with no additional data overhead, as the differential modulation inner code incurs no overhead, and the DSSS outer code's overhead is already incurred as part of the DSSS process. Usually DSSS is used to increase the effective data rate over a channel, by improving the effective SNR of the signal, so using the present method will usually improve the BER of the resulting data stream without reducing the data rate. Typically, it will be found that no additional ECC is required.

Figure 4:
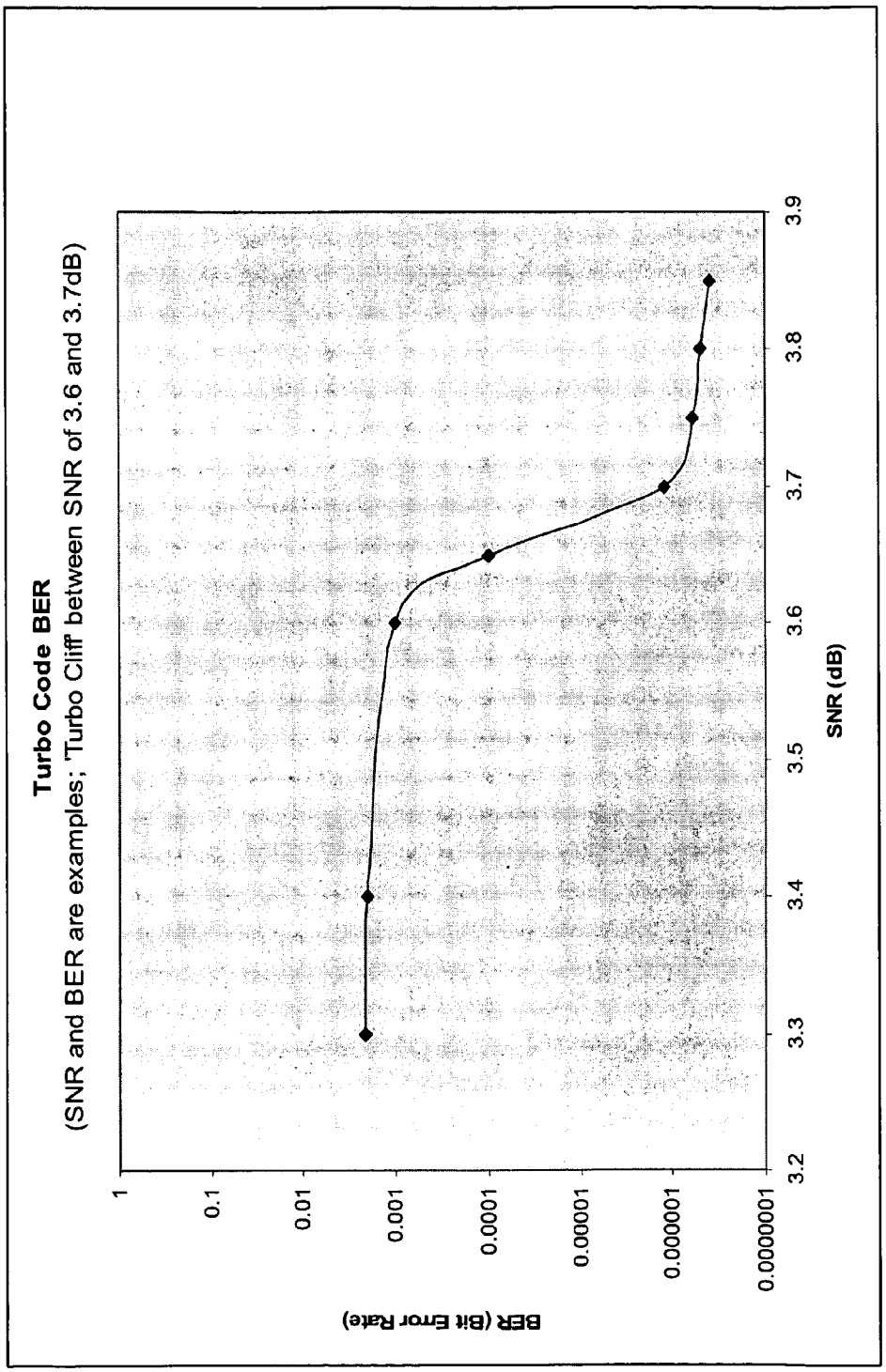
FIG. 4 is a graph showing an example of turbo code signal-to-noise ration (SNR) verses bit error rate (BER) and illustrating a "turbo cliff".

The implemented DSSS turbo coding method shows properties consistent with other turbo codes, notably the 'Turbo Cliff'—a sharp drop in BER as the SNR of the received signal improves past some threshold value, as shown in FIG. 4.

The effectiveness of this approach is not dependent on any particular inner code. The example described below and shown in FIG. 5 uses differential modulation of PSK, but any valid inner code could be used. This makes the method useful in applications where no modulation is used (such as digital watermarking). Equally, the choice of PSK is arbitrary, and the other forms of modulation could equally be used as part of an inner coder using differential modulation.

The improved BER produced by this coding scheme can be utilized in several ways:
1) Reduction of transmission power (and thereby improving the power consumption of a portable device);
2) Increased range for a given BER;
3) Improve the data integrity (i.e. maintain transmission power and spreading factor, and obtain a better BER);
4) Increased data rate for a given BER (because the spreading factor can be reduced, allowing greater data bandwidth).

This coding method allows a unique trade-off between Eb/No (energy per bit over noise power spectral density); G (DSSS processing gain, which determines the code's resistance to narrowband error sources, such as jamming or multipath); spectral efficiency, R/W (the bandwidth used to transmit a given data bit rate); and the block size, N (which determines the code complexity and the two-way transmission latency).

Often the available bandwidth is fixed, so the best result will be obtained by reducing the spreading factor and increasing the data rate while keeping the transmission bandwidth constant, so that the system operates at the bottom of the 'turbo cliff' where the BER is acceptably low at any SNR the system will encounter.

This coding method is close to optimal for DSSS. The Shannon Limit or channel capacity is the amount of information a channel with given SNR and bandwidth is capable of carrying. Turbo codes typically give BER close to the Shannon Limit for the propagation channel, if the code properties are chosen to match the propagation channel characteristics. Schlegel & Perez, Ch. 11. Because a tradeoff between spreading factor and effective data rate can be carried out, the turbo coded DSSS system can be modified to match a very wide variety of channel characteristics, and will, therefore, also be close to optimal (the limitation to this is where the spreading factor is small, at which point the outer code's ECC properties become so poor that the turbo code does not perform close to the channel capacity).

This coding method allows a low BER to be achieved using quite small coding block sizes (N)—4 kbits or less—making the coding scheme attractive for applications where small block sizes are the norm. This is the case, for example, in underwater acoustic communications where the low data rate and long signal propagation time dictate that small block sizes must be used.

The turbo-coded DSSS method can also be applied to digital watermarking and similar applications. In this case, the watermark would be spread through the digital intellectual property (IP) (e.g. an image) by using DSSS with a very large spreading factor (hundreds or thousands). The advantage of this technique in the watermarking application is that the watermark could be recovered even after a large degree of image corruption had occurred.

Example Implementation

Figure 5:
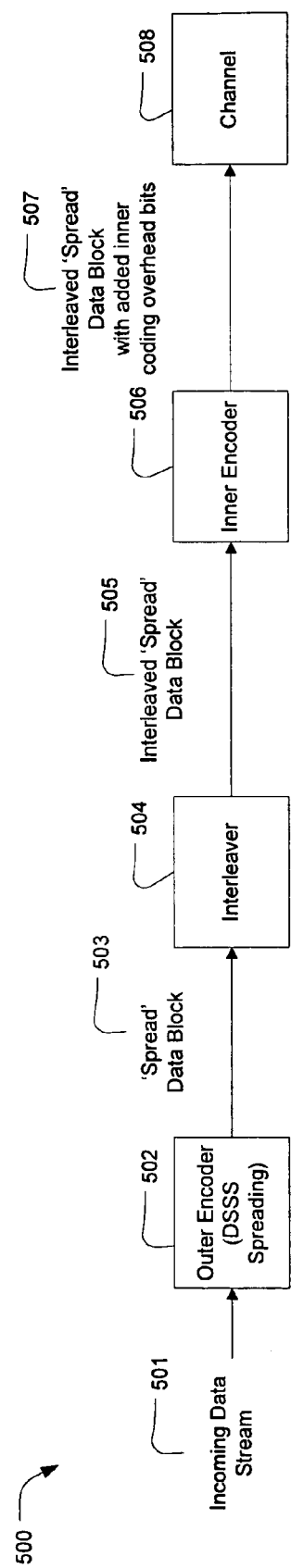
FIG. 5 is a block diagram of a turbo encoder using Direct Sequence Spread Spectrum (DSSS) in the outer decoder functional block in accordance with an embodiment of the present invention.

An example implementation of the DSSS turbo coder is shown in FIG. 5. DSSS turbo coder 500 begins by obtaining a DSSS PRN sequence at outer encoder 502. Outer encoder also receives incoming data stream 502. Outer encoder 502 then carries out the DSSS spreading operation as normal on incoming data stream 502 (the data bits of incoming data stream 502 are XOR'd with PRN sequence 510). 'Spread' data block 503 is interleaved by interleaver 504 and then inner coder 506 is applied. After modulation, the data is transmitted through channel 508.

Figure 3:
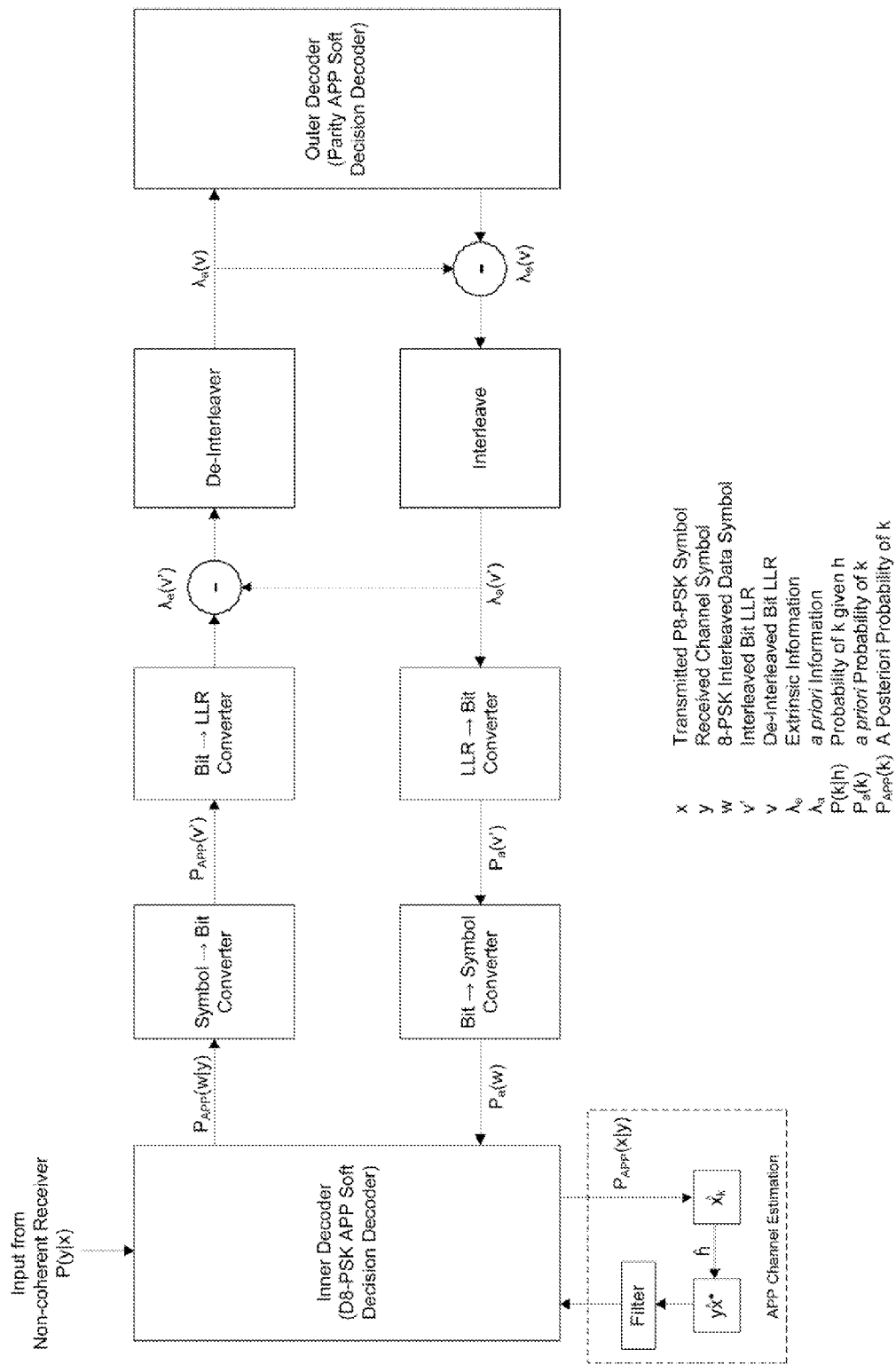
FIG. 3 is a block diagram of a turbo decoder implementing differential coded modulation.

For decoding on the receiver side, the inner decoder and the data flow between the inner decoder and the outer decoder may be implemented as defined by Howard and Schlegel and illustrated in FIG. 3. Howard and Schlegel, *Differential Turbo-Coded Modulation with APP Channel Estimation*, IEEE Transactions on Communications, Vol. 54, No. 8, 1397-1406 (August 2006).

Figure 6:
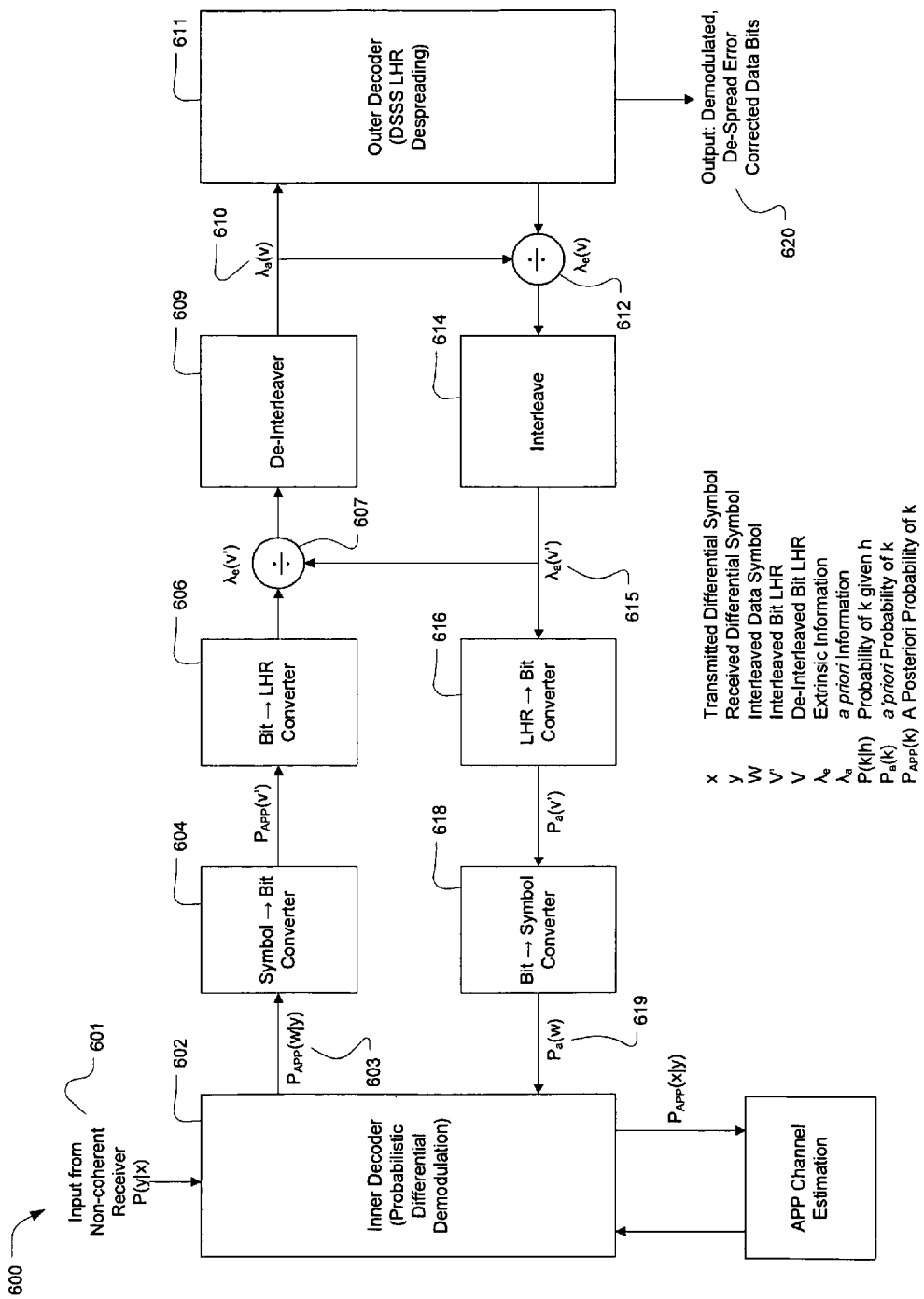
FIG. 6 is a block diagram of a turbo decoder using Direct Sequence Spread Spectrum (DSSS) in the outer decoder functional block in accordance with an embodiment of the present invention.

An example implementation of DSSS turbo decoder 600 is illustrated in FIG. 6. In this example, inner decoder 602 makes a probabilistic estimate of the code words of incoming data stream 601 using a priori probabilities 619 from outer decoder 611. During the first iteration, no a priori knowledge from outer decoder 611 is available, so uniform a priori probabilities are used. Code word probabilities 603 are then converted into bit probabilities in conversion operation blocks 604 and 606. On the second and subsequent iterations, the influence of a priori probabilities from outer decoder 611 is removed by dividing (via divider 607) inner decoder's 602 output LHRs by input LHRs 615. The modified block of bit LHRs from inner decoder 602 is then de-interleaved by de-interleaver 609. Interleaved block of bit LHRs 610 is then sent to Outer Decoder 611 for DSSS LHR de-spreading.

Outer Decoder 611 obtains the DSSS PRN sequence (by the same algorithm used in coding). Bit LHRs are XOR'd with the PRN sequence. The XOR operation carried out on the bit LHRs is consistent with XOR on binary values, as shown in the table below.

| Binary XOR | | | Binary/LHR XOR | | |
| --- | --- | --- | --- | --- | --- |
| Bit 1 | Bit 2 | XOR | PRN bit | LHR | LHR output from XOR of PRN with LHR |
| 0 | 0 | 0 | 0 | <1 | 1 * LHR |
| 0 | 1 | 1 | 0 | >1 | 1 * LHR |
| 1 | 0 | 1 | 1 | <1 | −1 * LHR |
| 1 | 1 | 0 | 1 | >1 | −1 * LHR |

The LHRs produced by the XOR operation for each PRN bit are combined by a Bayesian mechanism: the LHRs for each XOR'd LHR are multiplied (so for a spreading factor of 7, seven LHRs are multiplied together). (Multiplying LHRs in this way can be proved to be identical to using the Bayes' Rule for incorporating prior knowledge to form a probability estimate):

$$P(A \mid B) = \frac{P(A)P(B \mid A)}{P(B)}$$

Schlegel & Perez, p. 29. The resulting single LHR is the LHR for the output data bit. If transmission, propagation, and reception were carried out without introducing noise, the LHR that resulted would be either positive or negative infinity, corresponding to a 1 or 0 in the data block that was transmitted.

If decoding is complete, i.e. there are no significant changes in data bit probabilities, demodulated, de-spread error corrected data bits 620 are output.

If decoding is incomplete, i.e. changes have occurred in the data bit probabilities compared with the last iteration, then the block of output data bit LHRs is generated.

The influence of the a priori LHRs, i.e. the probability information already known when the LHRs arrived at Outer Decoder 611, is removed by dividing (via divider 612) the output LHRs by the input LHRs. The modified LHRs are then interleaved by interleaver 614. The interleaved LHRs 615 are converted to symbols 619 by converter operation blocks 616 and 618. LHR symbols 619 are used as prior probability inputs to inner decoder 602.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of decoding a turbo encoded direct sequence spread spectrum (DSSS) data stream, the method comprising:
  receiving a turbo encoded direct sequence spread spectrum (DSSS) data stream having a first plurality of symbols encoded using an inner error correction code and an outer error correction code, wherein the outer error correction code is based upon a pseudo random number (PRN) sequence associated with the DSSS, the PRN sequence comprising a plurality of PRN bits;
  decoding the first plurality of symbols using the inner error correction code to determine a probabilistic estimate of each of the first plurality of symbols and to convert the probabilistic estimate of each of the first plurality of symbols into a plurality of bit likelihood ratios (LHRs);
  removing a priori probabilities from the plurality of bit LHRs to create a first plurality of modified bit LHRs;
  de-interleaving the first plurality of modified bit LHRs to create a first plurality of de-interleaved modified bit LHRs;
  de-spreading and decoding the first plurality of de-interleaved modified bit LHRs by performing an XOR (exclusive or) operation on the first plurality of de-interleaved modified bit LHRs and the plurality of PRN bits of the PRN sequence to create a first plurality PRN LHRs; and
  multiplying together each of the first plurality of PRN LHRs to obtain a decoded bit LHR for the first plurality of interleaved modified bit LHRs.

2. The method of claim 1, wherein the probabilistic estimate of the plurality of symbols is determined using probabilistic differential demodulation.

3. The method of claim 2, wherein the probabilistic differential demodulation is performed using uniform a priori information.

4. The method of claim 1, further comprising outputting the decoded bit LHR responsive to decoding being complete.

5. The method of claim 1, further comprising outputting the de-spread, de-interleaved bit LHRs responsive to decoding being complete.

6. The method of claim 1, further comprising:
  removing a priori probabilities from the de-spread LHRs to create a second plurality of modified bit LHRs;
  interleaving the second plurality of modified bit LHRs to create a plurality of interleaved modified bit LHRs; and
  converting the plurality of interleaved modified bit LHRs to a second plurality of symbols, wherein the second plurality of symbols are used as prior probabilities in determining the probabilistic estimate of the first plurality of symbols.

7. A direct sequence spread spectrum (DSSS) turbo decoder comprising:
  an inner decoder for receiving a turbo encoded direct sequence spread spectrum (DSSS) data stream, the data stream having a first plurality of symbols encoded using an inner error correction code and an outer error correction code, wherein the outer error correction code is based upon a pseudo random number (PRN) sequence associated with the DSSS, the inner decoder for determining a probabilistic estimate of the first plurality of symbols;
  symbol-to-likelihood ratio (LHR) conversion circuitry coupled to the inner decoder for converting the probabilistic estimate of each of the first plurality of symbols into a first plurality of bit likelihood ratios (LHRs);
  a first divider coupled to the symbol-to-LHR conversion circuitry for removing a priori probabilities from the first plurality of bit LHRs to create a first plurality of modified bit LHRs;
  a de-interleaver coupled to the first divider for de-interleaving the first plurality of modified bit LHRs, to create a first plurality of de-interleaved modified bit LHRs; and
  an outer decoder coupled to the de-interleaver for performing de-spreading and decoding on the plurality of de-interleaved modified bit LHRs using the PRN sequence of the DSSS data stream.

8. The DSSS turbo decoder of claim 7, further comprising:
  a second divider coupled to the de-interleaver and the outer decoder for removing a priori probabilities from the de-spread LHRs to create a second plurality of modified bit LHRs;
  an interleaver coupled to the first divider and the second divider for interleaving the second plurality of modified bit LHRs to create a plurality of interleaved bit LHRs; and
  LHR-to-symbol conversion circuitry coupled to the interleaver and to the inner decoder for converting the plurality of interleaved bit LHRs to a second plurality of symbols, wherein the second plurality of symbols are used as prior probabilities in determining the probabilistic estimate of the first plurality of symbols.

9. The DSSS turbo decoder of claim 7, wherein the inner decoder determines the probabilistic estimate of each of the first plurality of symbols using probabilistic differential demodulation.

10. The DSSS turbo decoder of claim 9, wherein the inner decoder performs probabilistic differential demodulation using uniform a priori information.

11. The DSSS turbo decoder of claim 7, wherein the outer decoder outputs the de-spread, de-interleaved bit LHRs responsive to decoding being complete.

12. The DSSS turbo decoder of claim 7, wherein the outer decoder performs de-spreading and decoding on the plurality of de-interleaved bit LHRs by:

obtaining the PRN sequence comprising a plurality of PRN bits;

generating a plurality of PRN LHRs by performing an XOR (exclusive or) operation on the first plurality of de-interleaved bit LHRs and the PRN sequence; and multiplying together each of the plurality of PRN LHRs derived from the first plurality of de-interleaved bit LHRs to obtain a decoded bit LHR for the first plurality of interleaved bit LHRs.

13. The DSSS turbo decoder of claim 12, wherein the outer decoder outputs the decoded bit LHR responsive to decoding being complete.

* * * * *